(12) United States Patent
Mets et al.

(10) Patent No.: US 7,225,193 B2
(45) Date of Patent: May 29, 2007

(54) METHOD AND APPARATUS FOR RETRIEVING EVENT DATA RELATED TO AN ACTIVITY

(75) Inventors: Christiaan M. H. Mets, Chandler, AZ (US); Michael J. Emery, Holden, MA (US); David F. Rybarczyk, Phoenix, AZ (US); James A. Strilich, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 257 days.

(21) Appl. No.: 10/026,326

(22) Filed: Dec. 21, 2001

(65) Prior Publication Data
US 2003/0120661 A1    Jun. 26, 2003

(51) Int. Cl.
*G06F 7/00* (2006.01)
*G06F 17/40* (2006.01)

(52) U.S. Cl. .................... 707/100; 707/4; 707/10; 707/2; 709/217; 709/218; 702/178; 702/179

(58) Field of Classification Search .......... 707/2–6, 707/100–104.1, 10; 705/1, 7, 32; 702/2, 702/3, 187, 178–179; 709/318, 217–219
See application file for complete search history.

(56) References Cited

U.S. PATENT DOCUMENTS

| | | | |
|---|---|---|---|
| 4,130,867 A * | 12/1978 | Bachman et al. .......... | 707/1 |
| 5,325,522 A | 6/1994 | Vaughn ...................... | 707/1 |
| 5,349,662 A * | 9/1994 | Johnson et al. ............ | 717/127 |
| 5,561,796 A * | 10/1996 | Sakamoto et al. .......... | 707/3 |
| 5,590,325 A * | 12/1996 | Kolton et al. ............... | 707/3 |
| 5,603,024 A * | 2/1997 | Goldring ..................... | 707/203 |

(Continued)

FOREIGN PATENT DOCUMENTS

EP         0 592 921          10/1993

(Continued)

OTHER PUBLICATIONS

International Search Report, dated May 20, 2003, relative to PCT application No. PCT/US 02/41734, the foreign equivalent to the instant U.S. Appl. No. 10/026,326.

*Primary Examiner*—John Breene
*Assistant Examiner*—Anh Ly
(74) *Attorney, Agent, or Firm*—Paul D. Greeley

(57) ABSTRACT

A method and apparatus that processes time series, event and/or activity data of a process according to a data structure is disclosed. The data structure defines one or more activities that frame the time series, event and/or activity data. Each activity and each event has one or more attributes. Each attribute has a value. At least one of the attributes defines an interval of the activity by start and end times. Another attribute includes a time varying parameter that represents the time series data. Another attribute defines a time stamp of an event. The time varying parameter is linked to a device that produces the time series data when the process is run. The time series, event and/or activity data is collected and processed according to the data structure for storage in and/or retrieval from a memory. A relationship between data of one or more activities and the time series, event and/or activity data is processed according to the data structure to retrieve the time series, event and/or activity data from the memory.

26 Claims, 11 Drawing Sheets

U.S. PATENT DOCUMENTS

| | | | | |
|---|---|---|---|---|
| 5,613,113 | A * | 3/1997 | Goldring | 707/201 |
| 5,648,900 | A | 7/1997 | Bowen et al. | 705/5 |
| 5,732,401 | A * | 3/1998 | Conway | 705/1 |
| 5,818,713 | A * | 10/1998 | Uchihara et al. | 700/79 |
| 5,848,395 | A | 12/1998 | Edgar et al. | 705/9 |
| 5,856,931 | A | 1/1999 | McCasland | 702/182 |
| 5,890,134 | A | 3/1999 | Fox | 705/9 |
| 5,909,672 | A * | 6/1999 | Madore et al. | 705/32 |
| 5,939,974 | A | 8/1999 | Heagle et al. | 340/286.09 |
| 5,941,305 | A | 8/1999 | Thrasher et al. | 166/53 |
| 5,974,457 | A * | 10/1999 | Waclawsky et al. | 709/224 |
| 6,065,009 | A * | 5/2000 | Leymann et al. | 707/10 |
| 6,073,110 | A | 6/2000 | Rhodes et al. | 705/8 |
| 6,098,047 | A * | 8/2000 | Oku et al. | 705/7 |
| 6,298,307 | B1 * | 10/2001 | Murphy et al. | 702/3 |
| 6,341,283 | B1 * | 1/2002 | Yamakawa et al. | 707/101 |
| 6,345,259 | B1 * | 2/2002 | Sandoval | 705/7 |
| 6,463,465 | B1 | 10/2002 | Nieuwejaar | 709/217 |
| 6,480,830 | B1 | 11/2002 | Ford et al. | 705/9 |
| 6,526,405 | B1 * | 2/2003 | Mannila et al. | 707/6 |
| 6,590,507 | B2 * | 7/2003 | Burns | 340/995.13 |
| 6,606,606 | B2 | 8/2003 | Starr | 705/35 |
| 6,609,085 | B1 * | 8/2003 | Uemura et al. | 702/189 |
| 6,622,116 | B2 | 9/2003 | Skinner et al. | 702/183 |
| 6,625,567 | B1 * | 9/2003 | McMahan | 702/179 |
| 6,633,823 | B2 * | 10/2003 | Bartone et al. | 702/57 |
| 6,647,370 | B1 | 11/2003 | Fu et al. | 705/8 |
| 6,675,226 | B1 * | 1/2004 | Nair et al. | 709/250 |
| 6,868,367 | B2 * | 3/2005 | Yemini et al. | 702/183 |
| 6,898,597 | B1 * | 5/2005 | Cook et al. | 707/10 |
| 6,907,305 | B2 * | 6/2005 | Mata et al. | 700/100 |
| 7,027,954 | B2 * | 4/2006 | Mets et al. | 702/187 |
| 7,086,009 | B2 * | 8/2006 | Resnick et al. | 715/771 |
| 2002/0059183 | A1 * | 5/2002 | Chen | 707/1 |
| 2002/0107841 | A1 * | 8/2002 | Hellerstein et al. | 707/3 |
| 2002/0116453 | A1 * | 8/2002 | Todorov et al. | 709/203 |
| 2002/0133490 | A1 * | 9/2002 | Conkwright et al. | 707/9 |
| 2002/0165733 | A1 * | 11/2002 | Pulkkinen et al. | 705/2 |
| 2003/0009250 | A1 * | 1/2003 | Resnick et al. | 700/94 |
| 2003/0014400 | A1 * | 1/2003 | Siegel | 707/3 |
| 2003/0014498 | A1 * | 1/2003 | Kreidler et al. | 709/217 |
| 2003/0014500 | A1 * | 1/2003 | Schleiss et al. | 709/218 |
| 2003/0033543 | A1 | 2/2003 | Hubbard et al. | 713/201 |
| 2003/0059183 | A1 | 3/2003 | Militaru | 385/112 |
| 2003/0120627 | A1 | 6/2003 | Emery et al. | 707/1 |
| 2003/0149556 | A1 * | 8/2003 | Riess | 703/21 |
| 2003/0204370 | A1 * | 10/2003 | Yemini et al. | 702/183 |
| 2004/0006566 | A1 * | 1/2004 | Taylor et al. | 707/100 |
| 2004/0141420 | A1 | 7/2004 | Hardage et al. | 367/149 |
| 2005/0010664 | A1 | 1/2005 | Hubbard | 709/224 |
| 2006/0129691 | A1 * | 6/2006 | Coffee et al. | 709/230 |
| 2007/0006149 | A1 * | 1/2007 | Resnick et al. | 717/116 |

FOREIGN PATENT DOCUMENTS

| | | |
|---|---|---|
| EP | 0 740 241 | 10/1996 |
| WO | WO 01/73666 | 10/2001 |

* cited by examiner

METHOD AND APPARATUS FOR RETRIEVING EVENT DATA RELATED TO AN ACTIVITY

FIELD OF THE INVENTION

This invention relates to a method and apparatus for processing event data of a process. In particular, the method and apparatus of the present invention is concerned with gathering, storing and retrieving event data of a process.

BACKGROUND OF THE INVENTION

A process takes place over a period of time. During the process various events occur and various parameters vary in value. There is a need to monitor a process in order to analyze its performance or of any parameters thereof, whether the process is an industrial one for the handling, treatment or flow of material or other process, such as the tracking of the weather or of commodities or other financial instruments and the like.

Current monitoring and processing systems monitor and store events that occur during the process and time sampled values (time series data) of the time variable parameters of the process. It is necessary to retrieve the process data for analysis and reports, for example, trending analysis and reports. The current systems have difficulty in retrieving events and time series data of a process. Generally, custom designed filtering systems are used to determine the events and time series data of interest.

Thus, there is a need for a flexible and efficient method and system for processing data that is relevant to a process.

SUMMARY OF THE INVENTION

The method of the present invention frames event data of a process with one or more activities. An activity is something that happened, happens or is planned to happen over a period of time. The period of time or interval of the activity frames event data associated with the happening. An activity may have one or more sub-activities, which may have one or more sub-sub-activities and so on, thereby resulting in a multi-tier hierarchy.

In a first embodiment of the method of the invention, the event data of a process is collected. The event data is processed according to a data structure that defines the event and an activity having an interval that frames the event. The processed event data is stored in a memory.

A second embodiment of the method of the invention retrieves event data of a process that is stored in a memory. An activity of the process and an event of the process are identified. The activity has an interval that frames the event. The activity and the event are processed to access the memory to retrieve the event data.

According to one aspect of the first and second embodiments of the method, the data structure includes an activity structure that comprises an identity and a plurality of attributes of the activity. According to another aspect of the first and second embodiments of the method, the data structure also includes an event structure that comprises an identity of the event and one or more attributes. The attributes of the activity structure include a start time and end time of the activity and an equipment used by the process during the activity. According to another aspect of the first and second embodiments of the method, one of the attributes of the event structure matches one of the attributes of the activity structure.

According to another aspect of the second embodiment of the method, the event is identified with reference that is either time based, direct or indirect with respect to the activity. The time based reference is with respect to a parameter that is independent of the process. The direct reference contains a reference by identity to the activity. The indirect reference contains a reference to an equipment that is used by the process during the activity.

A first and second embodiment of an apparatus of the present invention comprises a computer that performs the method of the first and second method embodiments of the invention.

According to a third embodiment of the method of the present invention, event data is processed according to the data structure for storage in a memory. The activity and the event are processed to access the memory and store or retrieve the event data.

A third embodiment of an apparatus of the present invention comprises a computer that performs the method of the fourth method embodiment of the invention.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
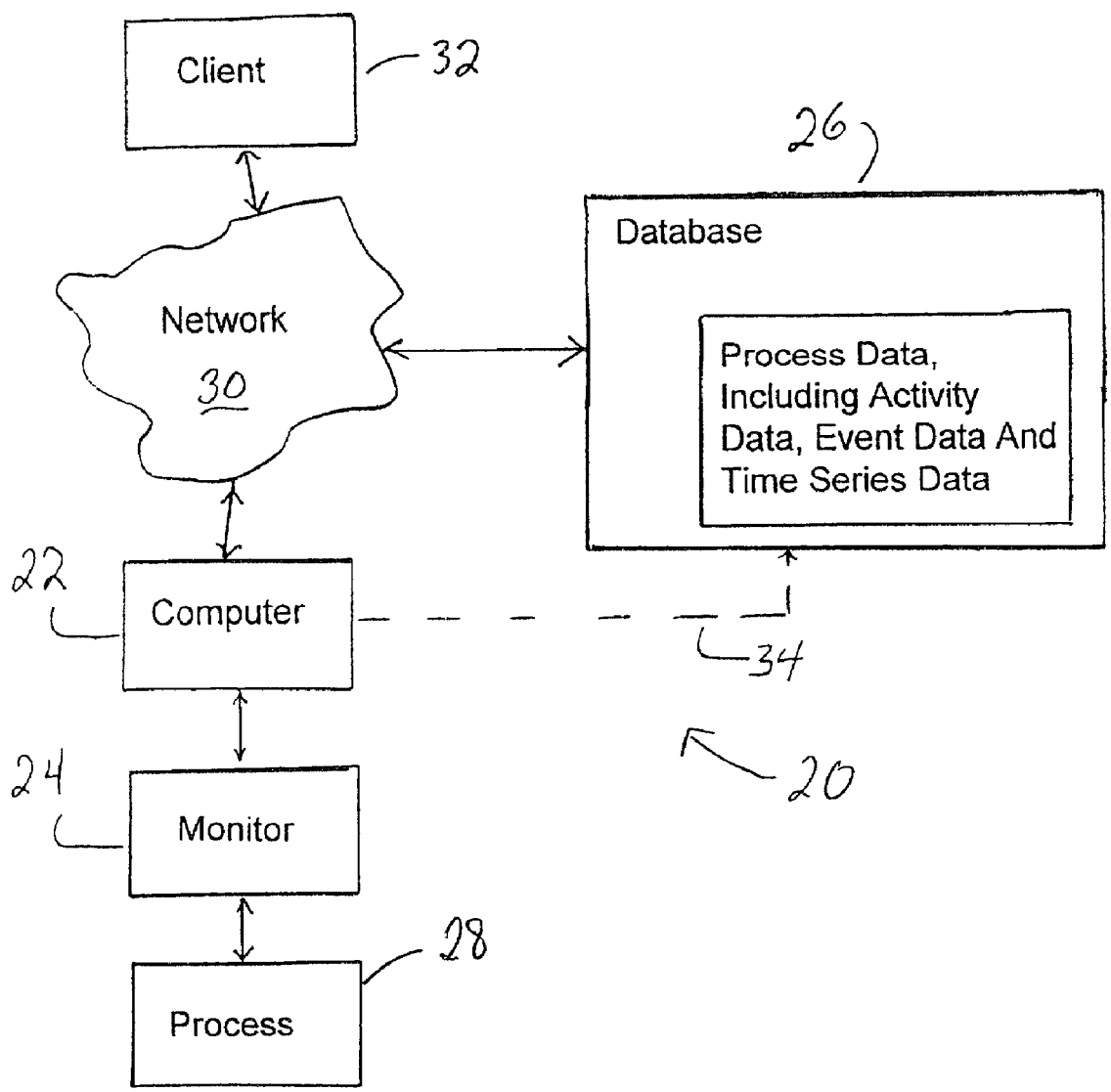
FIG. 1 is a block diagram of a system of the present invention for processing time series data.

Referring to FIG. 1, a system 20 of the present invention includes a computer 22, a monitor 24 and a database 24. A network 30 interconnects computer 22 and database 26 as well as a client device 32. Monitor 26 monitors a process 28 and provides process data to computer 22. Computer 22 processes the data and stores the data in a memory, such as database 26. Computer 22 may communicate with database 26 via network 30 or directly, as shown by the dashed line 34.

Database 26 may be a part of the memory of computer 22 or a separate A database, as shown in FIG. 1. Computer 22 may be a single computer or a plurality of computers interconnected via network 30. Network 30 may be any suitable wired or wireless communication network and may include the Internet an Intranet, the public telephone system and the like.

Client device 32 may be any suitable computer entry device with a capability to communicate with computer 22 via network 30. For example, if network 30 is the Internet, client device 32 has a browser capability for Internet communications. As such, client device 32 may be a personal computer (PC), a workstation, a phone or other suitable device. Similarly, computer 22 would be equipped with Internet capability to serve files and/or otherwise communicate via the Internet.

Figure 2:
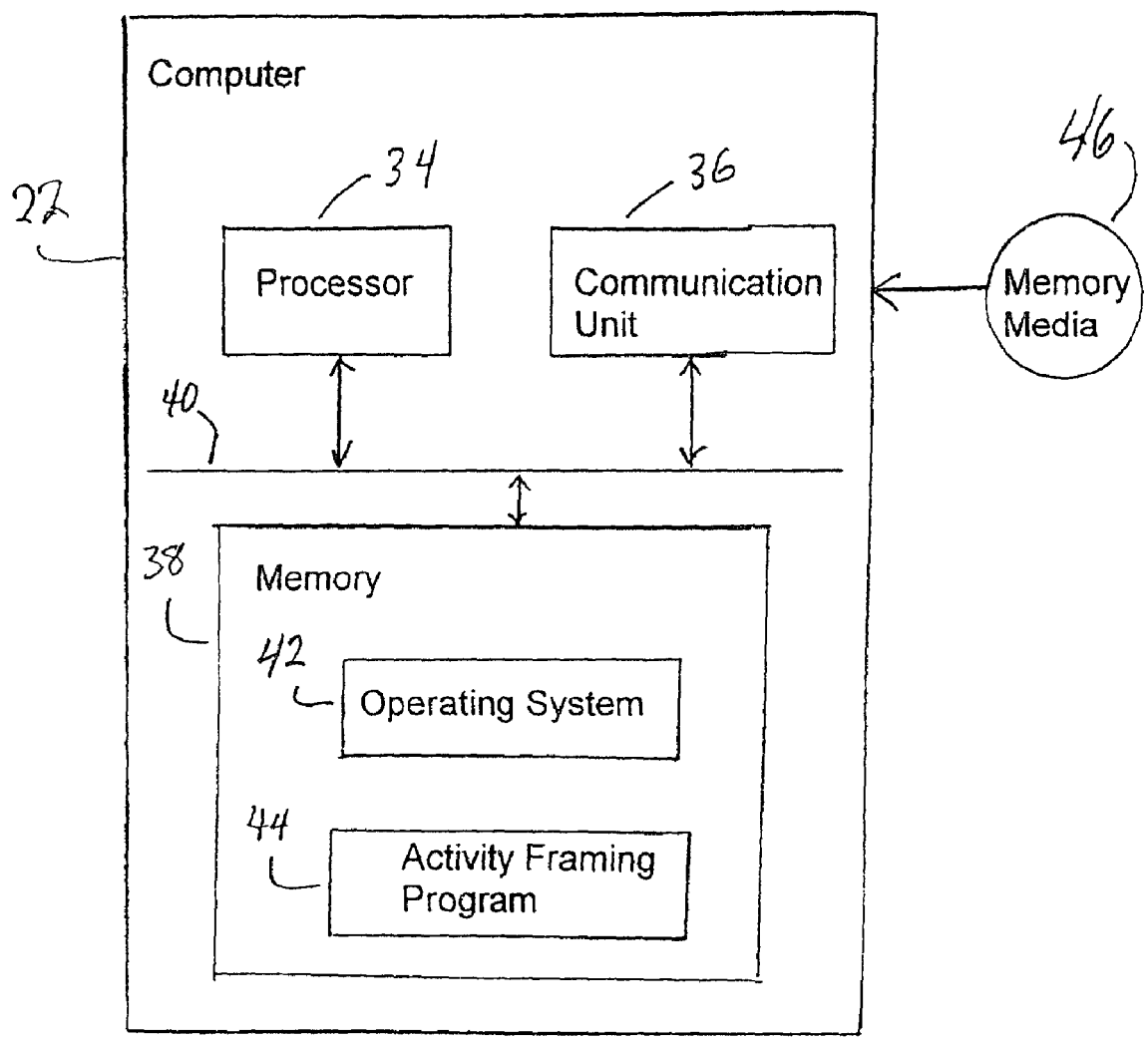
FIG. 2 is a block diagram of the computer of the FIG. 1 system.

Referring to FIG. 2, computer 22 includes a processor 34, a communications unit 36, a memory 38 and a bus 40. Bus 40 interconnects processor 34, communications unit 36 and memory 38. Memory 38 includes an operating system 42 and an activity framing program 44. Operating system 42 controls processor 34 to execute activity framing program 44 to process data of process 28 monitored by monitor 24. A memory media 46 (e.g., a disk) contains a copy of operating system 42, activity framing program 44 or other software, which can be loaded into memory 38. Communications unit 36 includes the capability to communicate via network 30.

Activity framing program 44, when run, permits a client to operate client device 32 to identify process 28 in terms of events, time variable parameters and activities. An event is something that happens at a specific time, for example, the triggering of an alarm. Time series data is continuous data of a time variable parameter, such as temperature, pressure, flow rate and the like. An activity is a time interval of the process, for example, the operation of a pump during the process.

Activity framing program 44, when run, allows the monitored time series data, event data and activity data to be framed by defined activities for later retrieval and access based on the defined activity, attributes thereof and tag (identity) of the device that develops the time variable data, e.g., a temperature sensor.

For the purpose of describing the apparatus and method of the invention, an exemplary process that unloads a material, such as oil, from a ship will be initially described. It is understood, of course, that the system and method of the invention can be used with any process that has events, time variable parameters and/or activities that can be framed by a defined activity.

Figure 3:
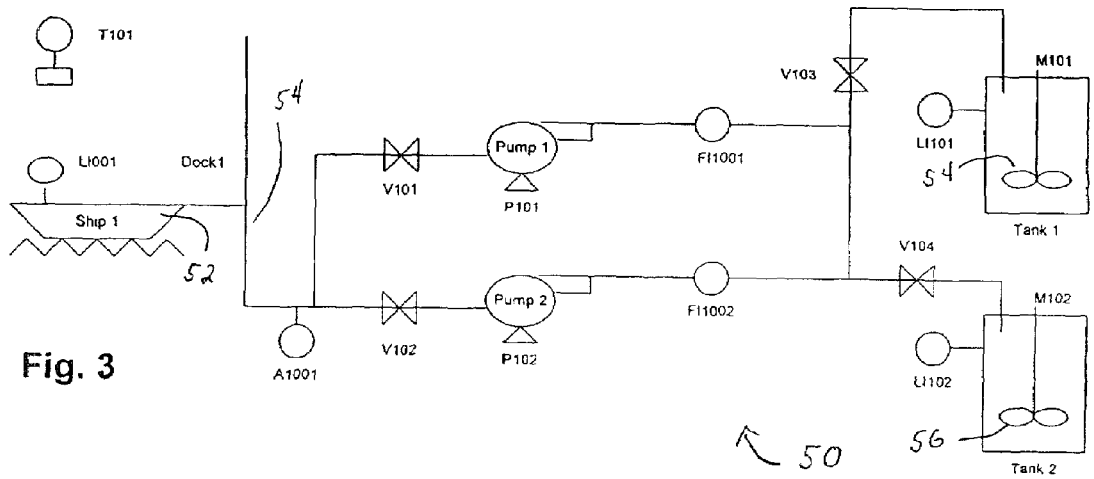
FIG. 3 depicts an exemplary process, its events, time series data and activities.

Referring to FIG. 3, a system 50 is shown for running process 28 for pumping out material from a ship 52 into a pair of holding tanks, Tank 1 and Tank 2. Ship 52 has a level indicator LI001 that monitors the material level in ship 52 during pump out process 28. A temperature monitor T101 monitors the outside ambient temperature as it can affect pumping performance. Material is pumped from ship 52 through pipes 54 and passes by a density analyzer A1001. The material is pumped to Tank 1 and Tank 2 by a pair of pumps, P101 and P102. When a valve V101 is open, the material is pumped by pump P101. When a valve V102 is open, the material is pumped by pump P102. A valve V103 controls the flow of material to Tank 1 and a valve V104 controls the flow of material to Tank 2. Flow rate to Tank 1 is monitored and controlled a flow analyzer FI1001. Flow rate to Tank 2 is monitored and controlled by a flow analyzer FI1002. A level indicator LI101 monitors the level of material in Tank 1 and a level indicator LI102 monitors the level of material in Tank 2. A motor M101 controls an agitator 54 in Tank 1 and a motor M102 controls an agitator 56 in Tank 2.

In system 50, the following constraints apply:
a. Contents of ship 52 do not fit into a single tank.
b. Only one tank can be filled at a time.
c. Only one pump can be used at a time.

Figure 4:
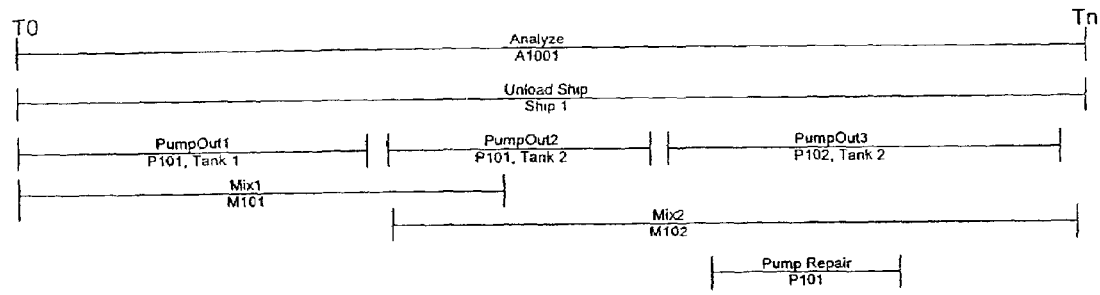
FIG. 4 depicts an activity diagram for the FIG. 3 process.

Referring to FIG. 4, a number of activities are defined for the pump out process of ship 52. The execution of the activities begins at a time T0 and completes at a time Tn. These activities are as follows:

1) Analyze activity—This activity continuously monitors analyzer A1001 throughout the pump out process from time T) to time Tn and alerts an operator if the material density is outside of a specified range.

2) Unload Ship activity—This activity is a procedure for initiating and monitoring the pump out of ship 52. It is the master procedure responsible for initiating sub activities: Pumpout1, Pumpout2, Pumpout3, Mix1, and Mix2.

3) Pumpout1, Pumpout2, Pumpout3 activities—These three pump out activities are of the same type, but each uses different settings. A pump out activity stops when a tank is full or a failure (e.g. pump failure) occurs. In such case, the higher-level activity Unload Ship is responsible to schedule another pump out activity with the appropriate settings until ship 52 is empty. Activity Pumpout1 moves material from ship 52 to Tank 1. Activity Pumpout1 stops when Tank 1 is full. Activity Pumpout2 pumps material from ship 52 to Tank 2. Activity Pumpout2 stops when pump P101 fails. Activity Pumpout3 uses pump P102 and continues pumping material to Tank 2 until ship 52 is empty.

4) Mix 1 activity—This activity is a procedure responsible for activating agitator 54 for Tank 1. Agitator 54 starts during activity Pumpout1 and runs for a period of time after the completion of activity Pumpout1.

5) Mix 2 activity—This activity is a procedure responsible for activating agitator 56 for Tank 2. Agitator 56 starts during activity Pumpout2 and runs for a period of time after the completion of activity Pumpout2.

These activities can be expressed in a hierarchical order of activity, sub-activity and sub-sub-activity as shown in Table 1.

TABLE 1

| Activity | Unload Ship |
| --- | --- |
| Sub-activity | Pumpout1 |
| Sub-sub-activity | Mix1 |
| Sub-activity | Pumpout2 |
| Sub-sub-activity | Mix2 |
| Sub-activity | Pumpout3 |
| Sub-sub-activity | Mix2 |

Figure 5:
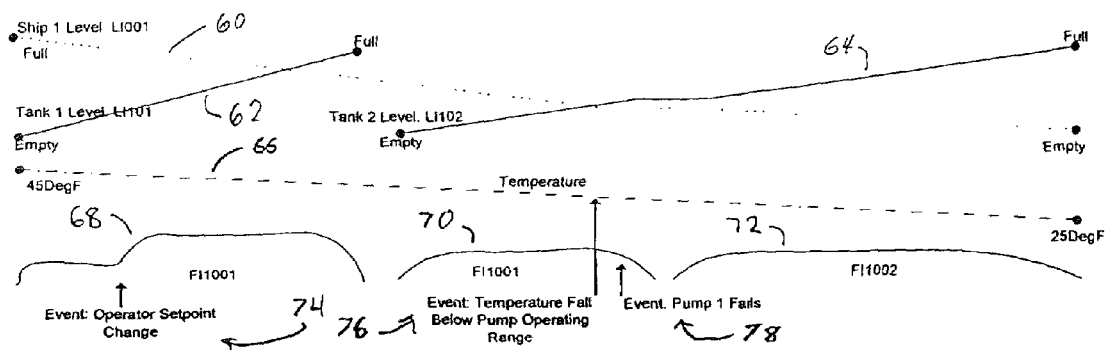
FIG. 5 depicts a data and event diagram for the FIG. 3 process.

Referring to FIG. 5, a curve 60 represents the material level in ship 52 (i.e., the values of level sensor LI001) during the activity Unload Ship. Curve 62 represents the material level in Tank 1 (i.e., the values of level sensor LI101) during the sub-activity Pumpout1. Curve 64 represents the material level in Tank 2 (i.e., the values of level sensor LI102) during sub-activity Pumpout2. A curve 66 represents the ambient temperature (i.e., the values of temperature sensor T101) during the activity Unload ship. A curve 68 represents the flow rate of material as monitored by flow rate sensor FI1001 during sub-activity Pumpout1. A curve 70 represents the flow rate of material as monitored by flow rate sensor FI1001 during sub-activity Pumpout2. A curve 72 represents the flow rate of material as monitored by flow rate sensor FI1002 during sub-activity Pumpout3. As can be seen, the outputs of level sensors LI001, LI101 and LI102 and of flow rate sensors FI1001 and FI1002 vary with time and are continuous or time series data.

FIGS. 3-5 show the execution of the activities and sub-activities required to pump out ship 52 over a period of time. At time T0, an instance of activity Unload ship is created. The operator would give the instance a name, for example, UNLOAD_2001_06_01. The operator would then initiate the activities in either an automated or manual manner.

As the activities are initiated, the process data shows a plurality of events 74, 76 and 78 that occur during the pump out process. Event 74 represents a flow change initiated by the operator to increase the flow rate during sub-activity Pumpout1. This flow rate change is monitored by sensor FI1001. Event 76 represents a temperature alarm detected when the ambient air temperature drops below a safe pump operating range during sub-activity Pumpout2. Event 78 represents a failure of pump P101 during sub-activity Pumpout2. As a result of the failure of pump P101, the process switches to the second pump P102.

Process 28 is initially defined as a data structure that has identified activities, sub-activities, sub-sub-activities, attributes, resources (e.g., sensors). Throughout the processing of the activities, sub-activities and sub-sub-activities of process 28, data is collected pertaining thereto, including time series data and event data. The apparatus and method of the present invention uses the data structure of activities, sub-activities and sub-sub-activities to frame time series data, event data and activity data. The framed data can then be processed, stored and retrieved based on the identity of the activity, sub-activity or sub-sub-activity, attributes thereof and/or the sensor that monitored the data. Time series data can be related to an activity based on time, direct reference or indirect reference. These relations will be described with reference to the unload ship process example.

Figure 6:
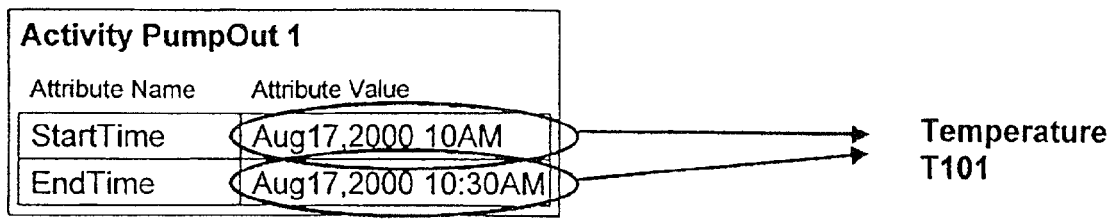
FIGS. 6-8 depict data structures for activity framed time series data.

The case of time series data related to an activity based on time will be described with reference to FIG. 6. Sub-activity Pumpout1 has two attributes, namely a start time and an end time. Each of these attributes has an attribute value. Thus, the start time value is Aug. 17, 2000 at 10:00 am and the end time value is Aug. 17, 2000 at 10:30 am. The ambient temperature is not directly or indirectly related to the sub-activity Pumpout1. It is a general reading for the whole site and any activity run, or any equipment being used. The time series temperature data is related to the time of sub-activity Pumpout1. Thus, to process, store or retrieve the time series temperature data monitored by temperature sensor T101, the identities of the sub-activity Pumpout1 and temperature sensor T101 are used.

Figure 7:
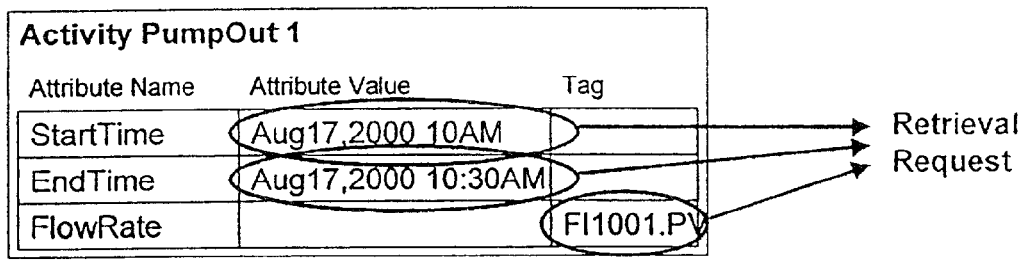

The case of time series data related to an activity based on direct reference will be described with reference to FIG. 7. An activity can have an attribute that is tied to a sensor value (i.e. the value of this attribute is not a single value, but its value changes over time). In FIG. 7, Sub-activity Pumpout1 has an additional attribute, namely flow rate. The flow rate is tied to flow rate sensor FI1001. The sensor identity (FI1001) is referred to herein as a tag. By giving an attribute a name (flow rate) and a sensor thereof a tag (FI1001), the same attribute (flow rate) can be used for the flow rate variable for a lot of different flow rate sensors. The time series data of flow rate sensor FI101 is related to sub-activity Pumpout1 by direct reference to the identities of the sub-activity, the attribute and the tag of the sensor. Thus, to process, store and retrieve the time series data monitored by flow rate sensor FI1001, the identities of the sub-activity, the flow rate attribute and the tag of the sensor are used. The direct reference case is an option that is used most often in a flexible system where devices are allocated at a granular level (e.g. at the pump level, as opposed to an equipment unit level, i.e. with all the devices built onto the equipment).

Figure 8:
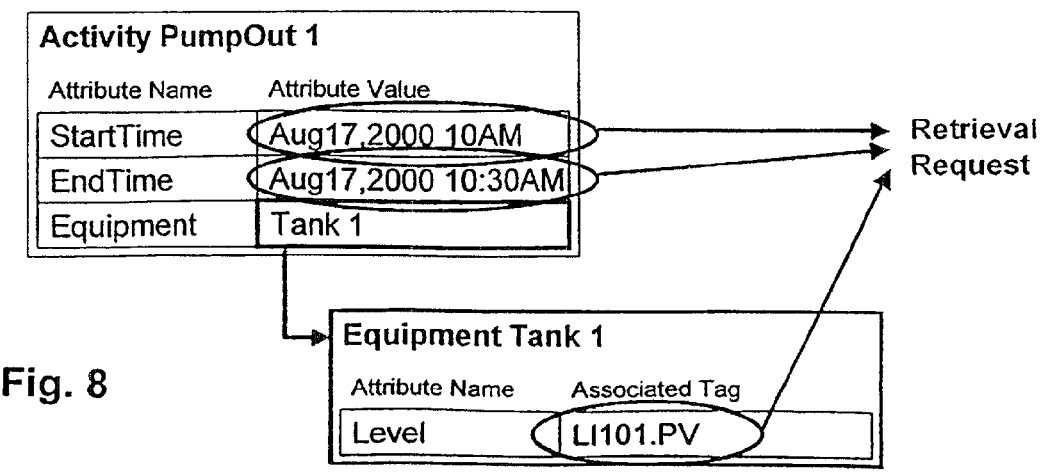

The case of time series data related to an activity based on indirect reference will be described with reference to FIG. 8. An activity can have an attribute that identifies equipment that is used by the activity. On this equipment, the user can define a plurality of equipment attributes for different parts of the equipment, with each part attribute being tied to a sensor by a tag. In FIG. 8, the sub-activity Pumpout1 has an attribute (equipment) that has an attribute value for an equipment part, namely Tank1. Attribute value (Tank 1) refers to an equipment (Tank 1) that has an attribute (Level) with an associated tag (sensor LI101). Thus, an indirect reference through the equipment attribute and sub-activity can be used to access time series data of a part of the equipment. This option is used most often when a complete equipment unit, with all the devices built onto it, is allocated for use by an activity, sub-activity and so on.

Event data can also be related to an activity based on time, direct reference or indirect reference. The case of event data related to an activity based on time will yield all events that happened during the activity.

Figure 9:
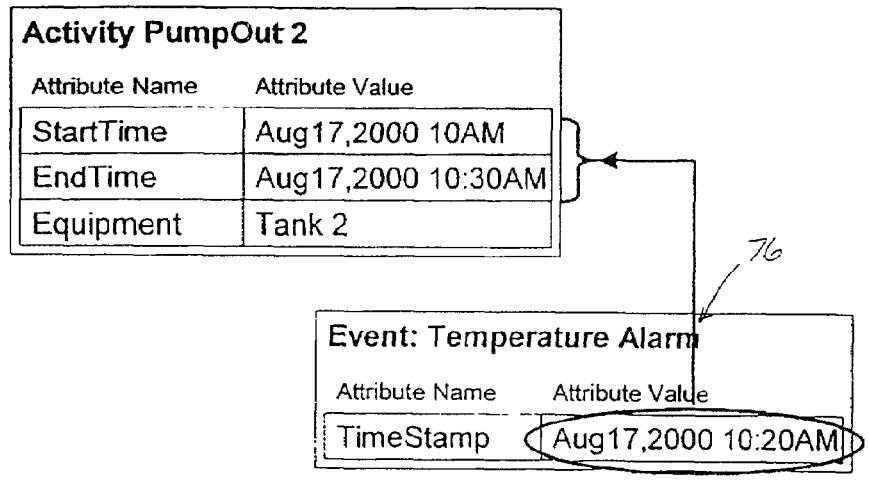
FIGS. 9-11 depict data structures for activity framed event data.

Referring to FIGS. 5 and 9, a time based retrieval request for events that happened during the activity PumpOut 2 identifies temperature alarm 76. The retrieval shows that temperature alarm 76 occurred at 10:20 am on Aug. 20, 2000 during sub-activity PumpOut 2.

Figure 10:
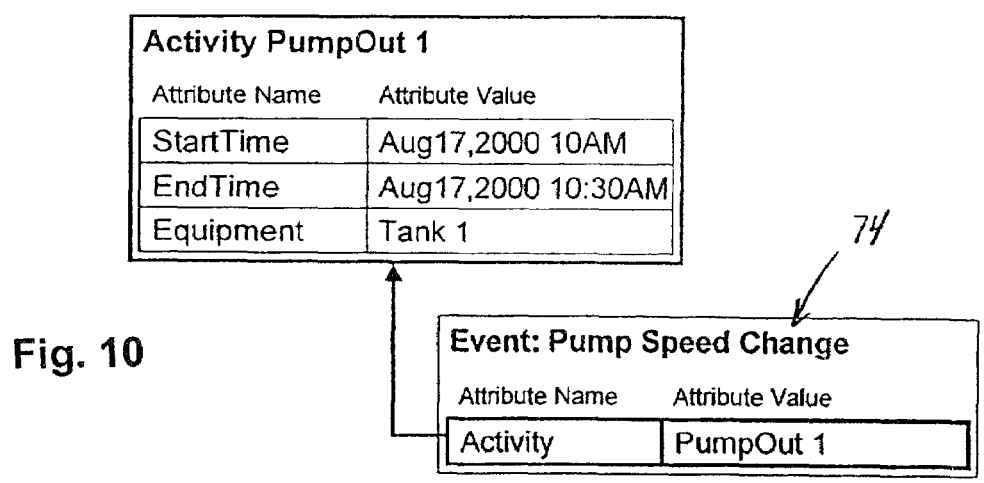

Referring to FIG. 10, a retrieval request for event 74 (FIG. 5) by direct reference to an activity or sub-activity identifies the sub-activity Pumpout1 and results in a retrieval of data for events that occurred during the sub-activity.

Figure 11:
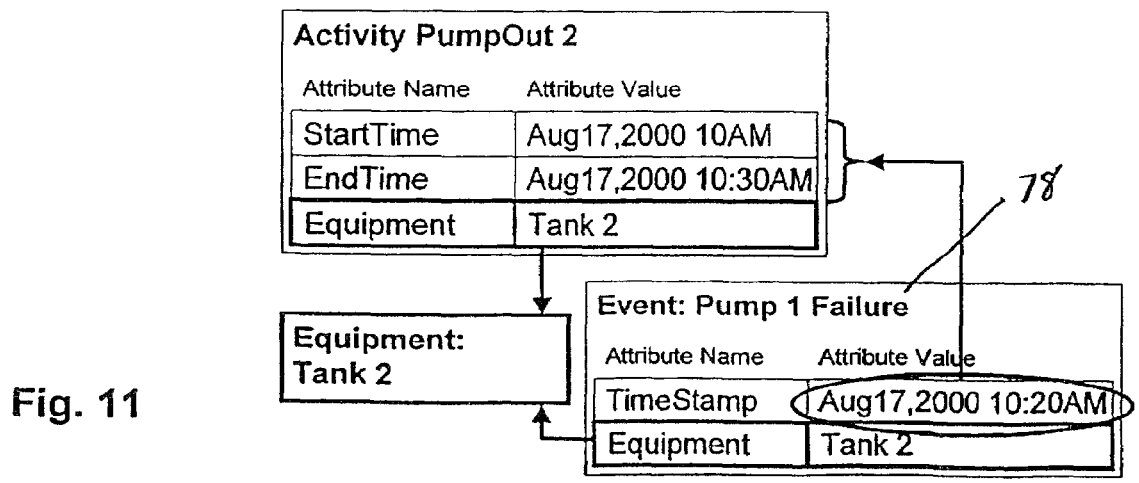

Referring to FIGS. 5 and 11, event 78 (FIG. 5) and activity Pumpout2 can be indirectly related to each other because they use the same equipment (referenced by one of their event/attributes).

An activity can also frame one or more other activities. That is, an activity can overlap another activity in whole or in part. An activity can be accessed by a time based reference, a direct reference or an indirect reference.

Figure 12:
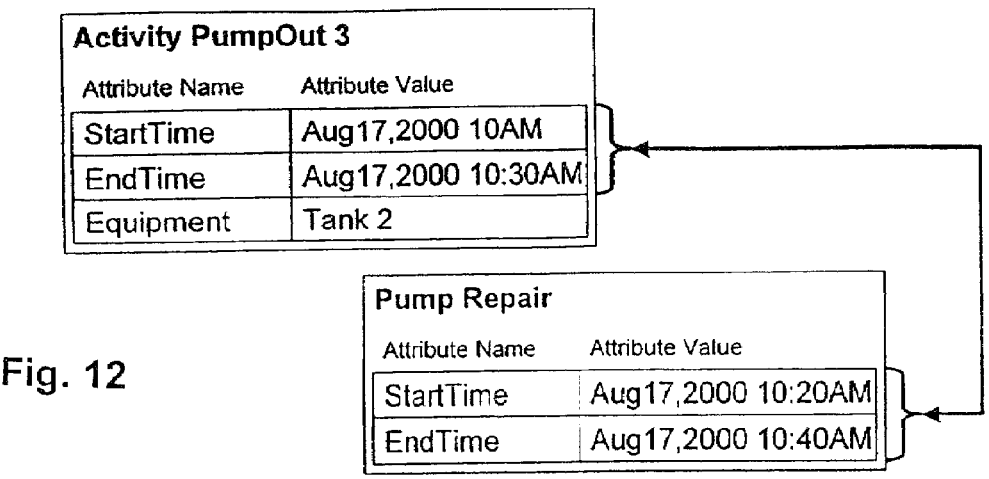
FIGS. 12-14 depict data structures for activity framed activity data.

Referring to FIG. 12, a retrieval request for those activities that are related to a first activity by a time based reference identifies the first activity by name (Pumpout3) and essentially requests data of any activity that occurs entirely or partly during the time of activity Pumpout3. The retrieval identifies the sub-sub-activity of Pump Repair.

Figure 13:
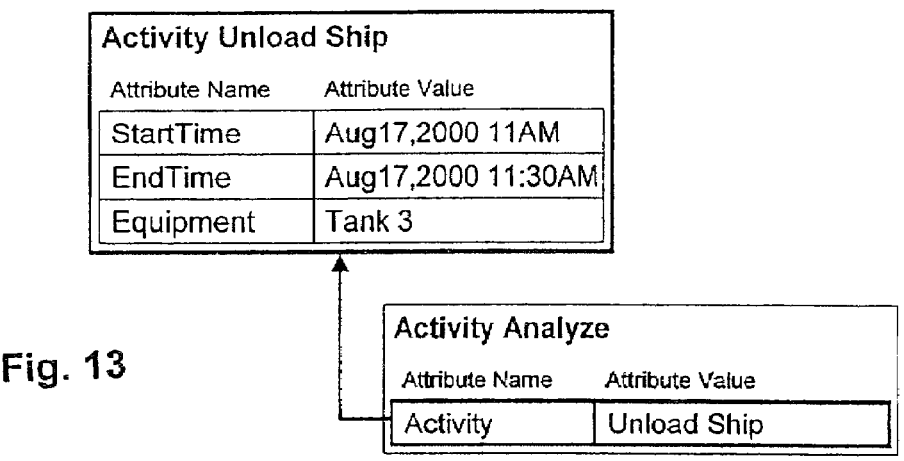

Referring to FIG. 13, a retrieval request for an activity by direct reference identifies all activities that have a direct reference thereto. Thus, if the request identifies the activity Unload Ship, data for the activity Analyze is retrieved.

Figure 14:
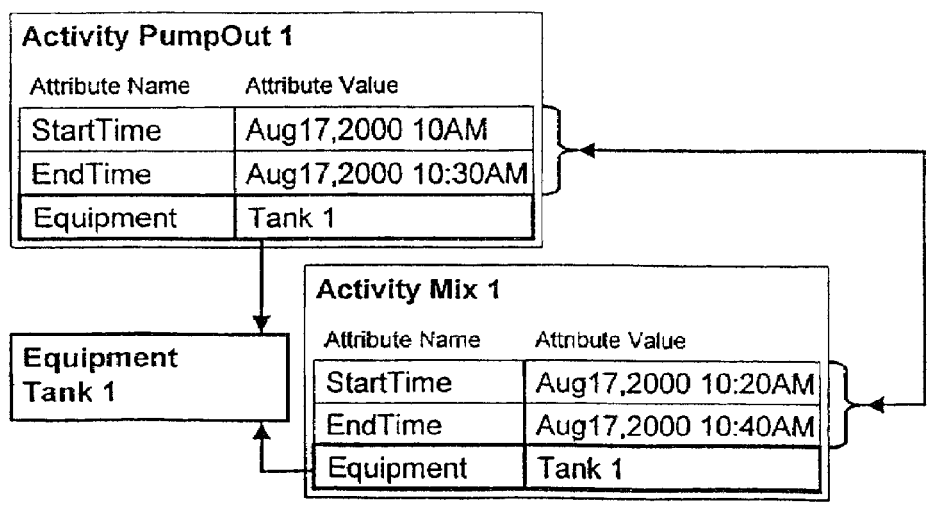

Referring to FIG. 14, a retrieval request for an activity by indirect reference identifies an equipment attribute and value of Tank 1 thereof. The retrieval reveals the sub-activity of Pumpout1 and the sub-sub-activity Mix1.

Figure 15:
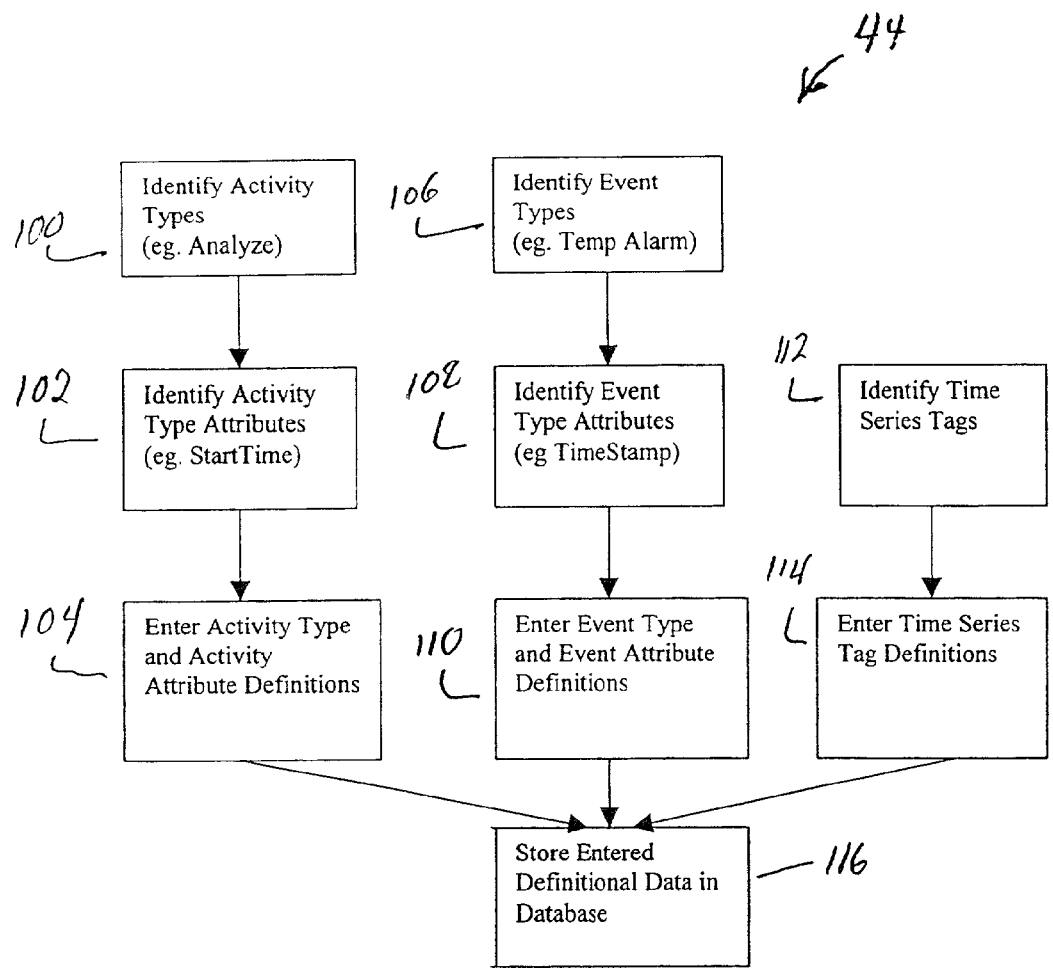
FIGS. 15-19 are flow diagrams of the activity framing program of the computer of FIG. 2.

Referring to FIG. 15, activity program 44 permits a user to define a process in terms of the activity/event/time series data structure. For example, the definitional data can be developed and identified during an interactive session between computer 22 and client device 32 operated by the user. Step 100 identifies the activities, sub-activities, sub-sub-activities and so on of the process. Step 102 identifies activity type attributes, such as start times and end times, time variable parameters (e.g., flow rate), equipment and tags. That is, step 102 defines the attributes of an activity that frames an event, a time varying parameter or another activity. Step 104 accepts activity types defined by step 100 and the attributes defined by step 102 for entry.

Step 106 identifies event types, such as temperature alarm 76. Step 108 identifies event type attributes, such as a time stamp (FIG. 9). Step 110 accepts event types defined by step 106 and the attributes defined by step 108 for entry. Step 112 identifies tags for sensors the monitor time series data. Step 114 accepts the tags defined by step 112. Step 116 stores the data accepted by steps 104, 110 and 114 in data base 26 in a manner that permits access by activity, event, attributes of either and/or tags. For example, database 26 may be physically or logically organized by activity, event, attributes of either and/or tags. If logically organized, a storage access translator would be used to translate the activity, event, attributes of either and/or tag access data into physical storage volumes.

Figure 16:
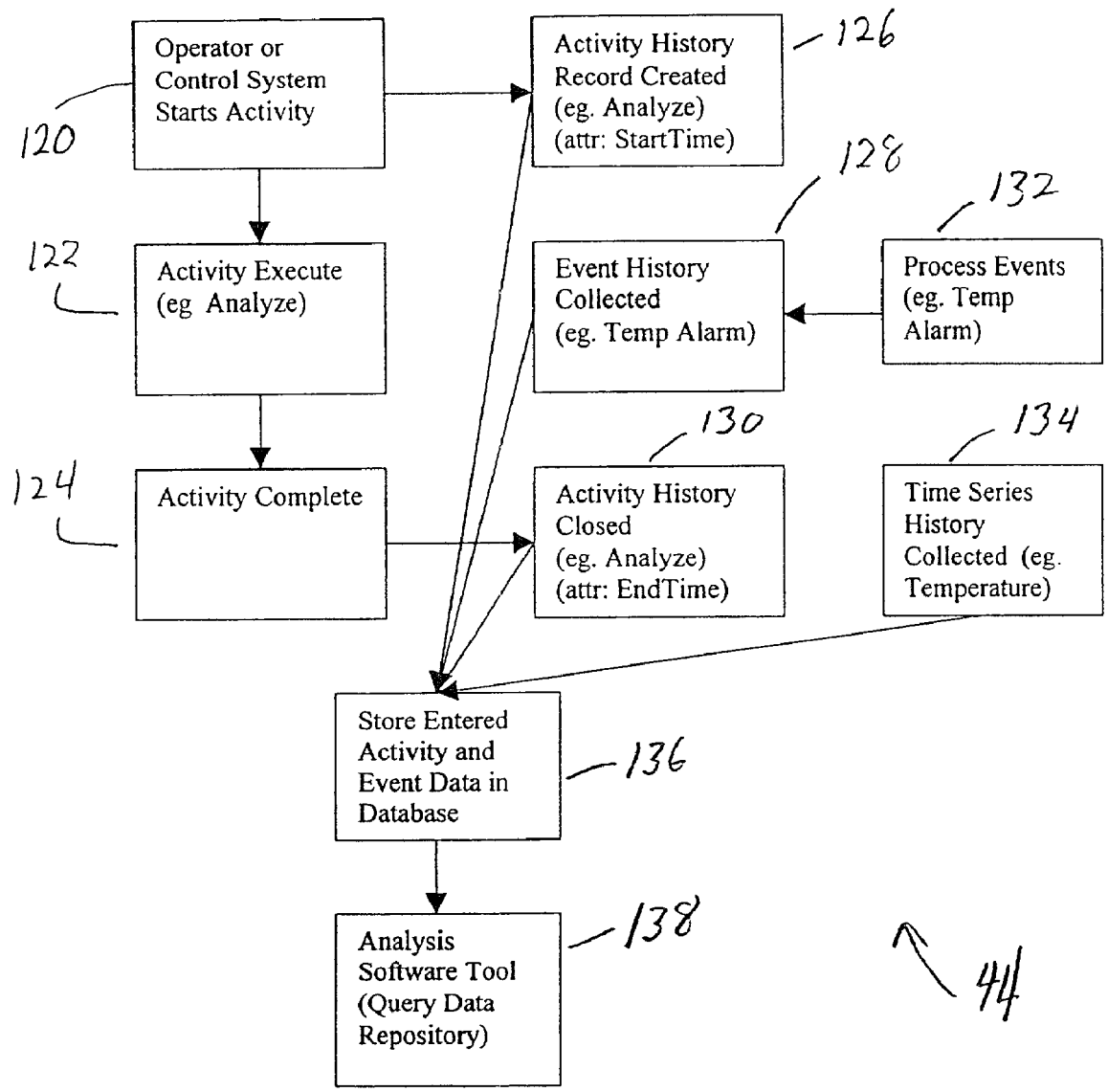

Referring to FIG. 16, activity program 44 also permits the collection of data during the running of the process, such as process 28. Step 120 identifies that the process has been initiated by the operator or automatically by a control system. Step 122 executes activities, such as Pumpout1 (FIGS. 4, 6-10 and 14). That is, step 122 processes the activity so as to frame the time series data and event data collected with an interval of the activity. Step 124 determines when the step 122 is finished. Step 130 closes the collection of activity data.

Step 126 creates an activity history record, such as attribute values (e.g., start time and end time). Step 128 collects event happenings, time stamps and the like for events, such as temperature alarm 76. Step 132 processes the event happenings and links them to activities of any tier. Step 134 collects time series data monitored by the various sensors of the process.

Step 136 stores the activity, event and time series data in database 26 for retrieval by activity, attribute thereof and/or tag. Step 138 retrieves the data activity, event, attribute and/or sensor tag for processing or analysis.

Figure 17:
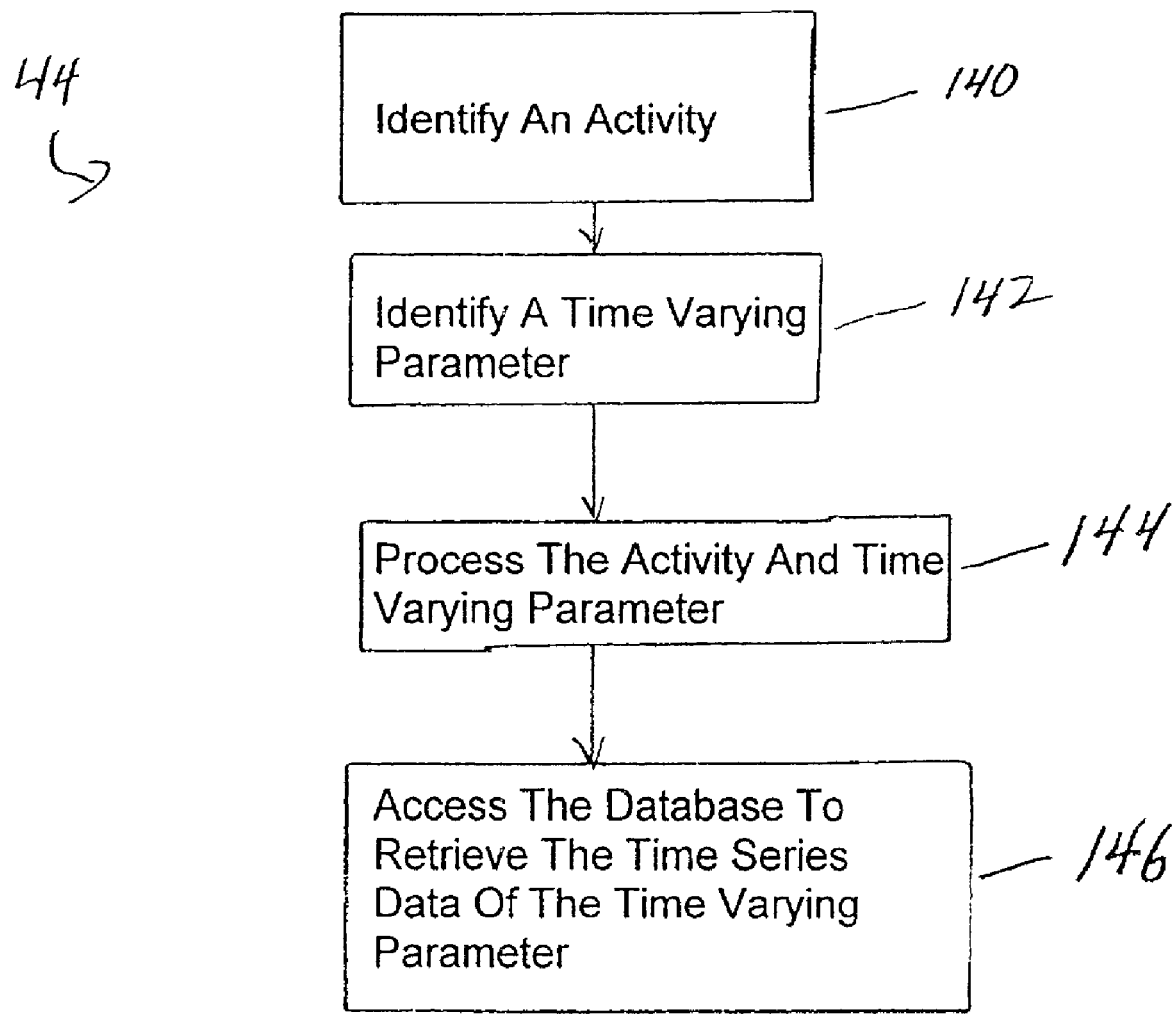

Referring to FIG. 17, time series data of process 28 is retrieved from database 26 by activity framing program 44, for example, via an interactive session with a user operating client device 32. Step 140 identifies an activity specified by the user. The activity is matched to the data structure thereof, which reveals the attribute that contains a start time and an end time.

Step 142 identifies a time varying parameter of process 28. If the time varying parameter, for example, the ambient temperature, is unrelated to the activities of the process, a tag identifies it. If the time varying parameter is directly related to the identified activity, it will be an attribute of the matched data structure and will have the associated tag for the device that monitors the time series data of the identified time varying parameter. Alternatively, if the time varying parameter is indirectly related to the activity, the data structure contains an equipment attribute. The equipment attribute identifies an equipment part, time varying parameter and tag for the device.

Step 144 processes the activity and time varying parameter into a form suitable for accessing the time series data of the time varying parameter. For example (with reference also to FIG. 7), if the user identifies the flow rate during the PumpOut 1 activity, step 144 presents the request in a form useable to access database 26. Step 146 then accesses database 26 to retrieve the time series data of the flow rate during the PumpOut 1 activity.

Figure 18:
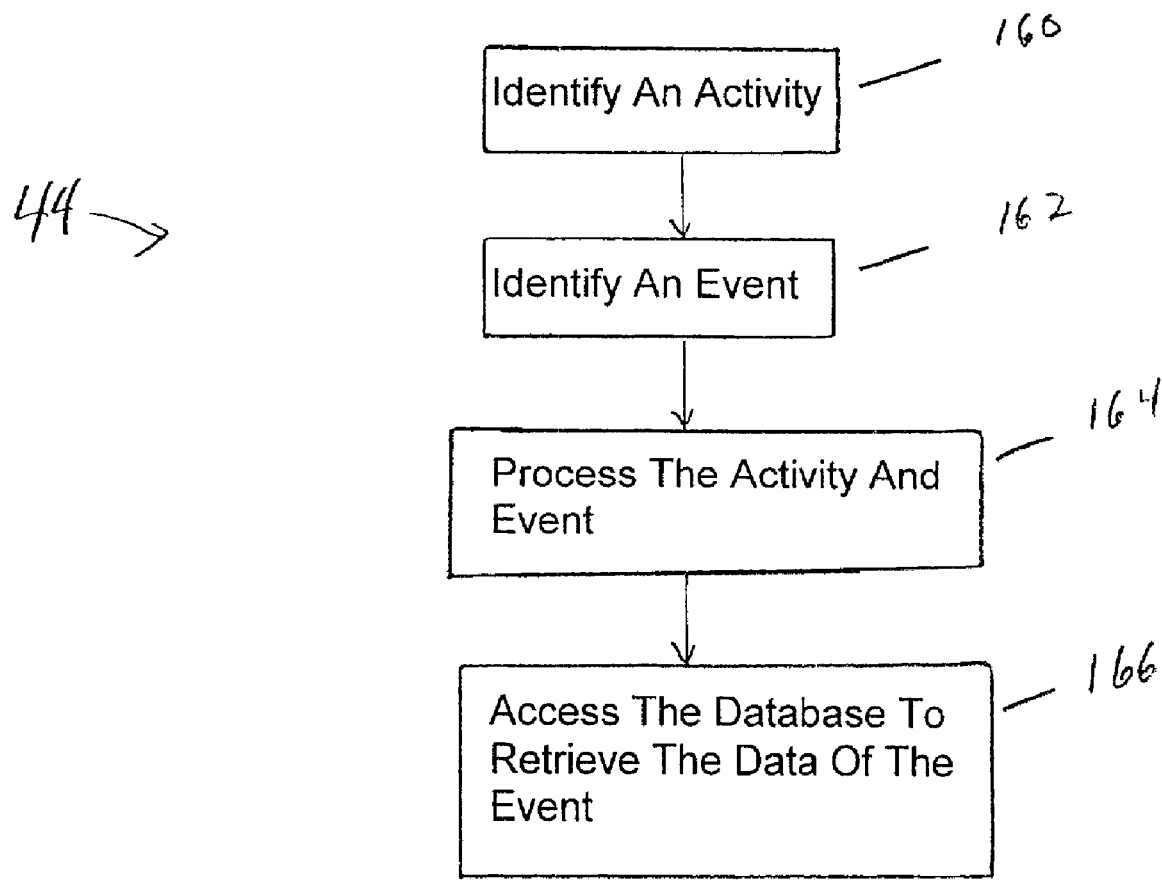

Referring to FIG. 18, event data of process 28 is retrieved from database 26 by activity framing program 44, for example, via an interactive session with a user operating client device 32. Step 160 identifies an activity, for example PumpOut 1 or PumpOut 2, specified by the user. The activity is matched to the data structure thereof, which reveals the attribute that contains a start time, an end time and an equipment.

Step 162 identifies an event of process 28. If step 162 is identifying an event that is not directly related to process 28 based on a time reference, all such events that happened during the interval of the activity will be identified. For example, if step 160 identifies the activity of PumpOut 2, step 162 will then identify temperature alarm 76 and Pump 1 Failure 78 as events that occur during the interval of PumpOut 2 (FIGS. 5 and 9).

If step 162 is selecting an event that has a direct reference to the activity, all events having an attribute that refers to the activity will be selected. For example, if step 160 identifies the activity as PumpOut 1 and step 162 requests events by direct reference, step 162 will then identify the event of Pump Speed change 74 (FIG. 10).

If step 162 is selecting an event by indirect reference to the activity, all events that happened on a given equipment while it was being used by the activity will be selected. For example, if step 160 identifies the activity of Pumpout 2 and step 162 requests events by indirect reference, the event of Pump 1 Failure 78 will be identified (FIG. 11).

Step 164 processes the activity and event into a form suitable for accessing the event data of the event. Step 166 accesses database 26 to retrieve the event data of the event that occurred during the interval of the activity.

Figure 19:
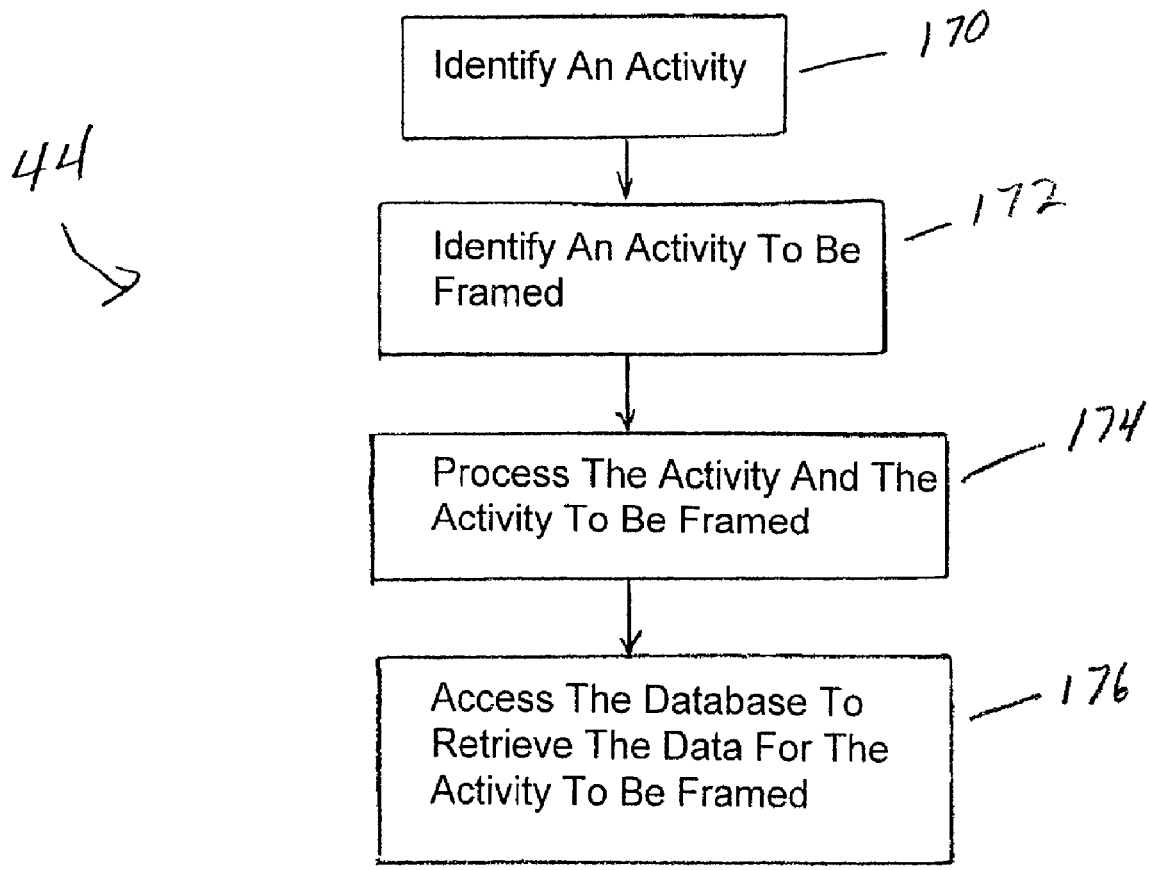

Referring to FIG. 19, activity data of process 28 is retrieved from database 26 by activity framing program 44, for example, via an interactive session with a user operating client device 32. Step 170 identifies an activity, for example Unload Ship, PumpOut 1 or Pumpout 3 (FIGS. 5 and 12-15), specified by the user. The activity is matched to the data structure thereof, which reveals the attribute that contains a start time, an end time and an equipment.

Step 172 identifies a related activity of the activity identified by step 170 that is to be framed. If the related activity is related to the activity based on a time reference, all related activities that happened entirely or partly during the interval of the activity will be selected. For example, if step 170 identifies the activity of PumpOut 3 (FIGS. 5 and 12) and step 172 requests related activities by a time based reference, step 172 will identify the activity of Pump Repair that happened partly during the interval of activity PumpOut 3 (FIG. 12).

If the activity to be framed is directly related to the activity identified by step 170, all related activities that have a reference thereto will be selected. For example, if step 170 selects the activity of Unload Ship, the related activity of Activity Analyze will be selected (FIG. 13) as it has an attribute value that refers to activity of Unload Ship.

If the activity to be framed is indirectly related to the activity identified by step 170, all related activities that occur entirely or partly during the activity interval and that reference the same equipment as the equipment referenced by the activity will be selected. For example, if step 170 identifies the activity PumpOut 1 that refers to Tank 1, related activity Mix 1 that also refers to Tank 1 will be identified (FIG. 14).

Step 174 processes the activity and the related activity into a form suitable for accessing the data of the related activity. Step 176 accesses database 26 to retrieve the data of the related activity for the interval of the activity.

The present invention having been thus described with particular reference to the preferred forms thereof, it will be obvious that various changes and modifications may be made therein without departing from the spirit and scope of the present invention as defined in the appended claims.

What is claimed is:

1. A computer apparatus for processing output data of an industrial process comprising:

a computer, a database and a monitor that collects said output data of said industrial process and provides said output data to said computer, wherein said computer comprises an activity framing program that when executed responds to input data entered by a user to define a data structure, wherein said activity framing program responds to said input data to define said data structure with a plurality of activities and events of said industrial process, at least a first attribute of a first one of said activities, and at least one attribute of a first one of said events, wherein said first event is time framed by said first activity, wherein said first attribute of said first activity has an attribute value that is linked to said first event, and wherein said request additionally identifies said attribute value, wherein said first attribute identifies an item used in said process and said attribute value identifies a device that is associated with said item and that is linked to said first event, wherein said framing program uses said data structure to store said output data in said database based on said activities, events and attributes, and wherein said framing program further responds to a request that identifies said first activity and said first attribute of said first activity by using said data structure to access said output data of said industrial process stored in said database to retrieve event data of said first event.

2. The computer apparatus of claim 1, wherein said first activity further comprises a second attribute, and wherein said first and second attributes define start and end times of said first activity, respectively.

3. The computer apparatus of claim 1, wherein said data structure is stored in one of said database and a separate memory.

4. A method for using a computer to process output data of an industrial process comprising:

operating said computer with an activity framing program in response to input data entered by a user to define a data structure, wherein said activity framing program responds to said input data to define said data structure with a plurality of activities and events of said industrial process, at least a first attribute of a first one of said activities, and at least one attribute of a first one of said events, wherein said first event is time framed by said first activity, wherein said first attribute of said first activity has an attribute value that is linked to said first event, and wherein said request additionally identifies said attribute value, wherein said first attribute identifies an item used in said process and said attribute value identifies a device that is associated with said item and that is linked to said first event, wherein said framing program uses said data structure to store said output data in a database based on said activities, events and attributes, and wherein said framing program further responds to a request that identifies said first activity and said first attribute of said first activity by using said data structure to access said output data of said industrial process in said database to retrieve event data of said first event.

5. A memory media comprising a computer readable activity framing program that when executed on a computer controls said computer to process output data of an industrial process, wherein said activity framing program controls said computer in response to input data entered by a user to define a data structure, wherein said activity framing program responds to said input data to define said data structure with a plurality of activities and events of said industrial process, at least a first attribute of a first one of said activities, and at least one attribute of a first one of said events, wherein said first event is time framed by said first activity, wherein said first attribute of said first activity has an attribute value that is linked to said first event, and wherein said request additionally identifies said attribute value, wherein said first attribute identifies an item used in said process and said attribute value identifies a device that is associated with said item and that is linked to said first event, wherein said framing program uses said data structure to store said output data in a database based on said activities, events and attributes, and wherein said framing program further responds to a request that identifies said first activity and said first attribute of said first activity by using said data structure to access said output data of said industrial process in said database to retrieve event data of said first event.

6. A method for using a computer to access output data of an industrial process that is stored in a memory, said method comprising:

(a) operating said computer with a program that generates an access request that is based on a data structure that comprises a plurality of activities and events of said industrial process, one or more attributes of a first one of said activities, and one or more attributes of a first one of said events, wherein said first event is framed by said first activity; wherein a first attribute of said first activity has an attribute value that is linked to said first event, and wherein said request additionally identifies said attribute value, wherein said first attribute identifies an item used in said process and said attribute value identifies a device that is associated with said item and that is linked to said first event, wherein said output data is stored in said memory based on said activities, events and attributes, and (b) operating said computer with said program in response to said access request, using said data structure to access said output data of said industrial process in said memory to retrieve event data of said first event.

7. The method of claim 6, wherein said data structure further comprises an identity of each of said attributes and an identity of each of said events.

8. The method of claim 7, wherein said activity attributes and said event attributes are selected from the group consisting of: time stamp, activity and item used in said industrial process.

9. The method of claim 8, wherein said item is an equipment, and wherein each of said activity attributes and each of said event attributes has an attribute value selected from the group consisting of: date and time, activity identity and device of said equipment used in said industrial process.

10. The method of claim 9, wherein said event data is linked to said device of said equipment.

11. The method of claim 7, wherein at least one of said event attributes matches at least one of said activity attributes.

12. The method of claim 6, wherein said request identifies said first event with a reference selected from the group consisting of: time based reference with respect to an interval of said first activity, direct reference to said first activity and indirect reference to said first activity.

13. The method of claim 12, wherein said time based reference is with respect to all events that occur during said interval.

14. The method of claim 12, wherein said direct reference directly refers to said first activity.

15. The method of claim 12, wherein said indirect reference includes a reference to an item used by said industrial process during said first activity.

16. A computer apparatus for accessing output data of an industrial process that is stored in a memory, said computer apparatus comprising:
   a computer and a framing program that generates an access request that is based on a data structure that comprises a plurality of activities and events of said industrial process, one or more attributes of a first one of said activities, and one or more attributes of a first one of said events, wherein said first event is time framed by said first activity, wherein a first attribute of said first activity has an attribute value that is linked to said first event, and wherein said request additionally identifies said attribute value, wherein said first attribute identifies an item used in said process and said attribute value identifies a device that is associated with said item and that is linked to said first event;
   wherein said output data is stored in said memory based on said activities, events and attribute; and
   wherein said computer in response to said access request, uses said data structure to access said output data of said industrial process in said memory to retrieve event data of said first event.

17. The apparatus of claim 16, wherein said data structure further comprises an identity of each of said attributes and each of said events.

18. The apparatus of claim 17, wherein said activity attributes and said event attributes are selected from the group consisting of: time stamp, activity and item used in said industrial process.

19. The apparatus of claim 18, wherein said item is an equipment, and wherein each of said activity attributes and each of said event attributes has an attribute value selected from the group consisting of: date and time, activity identity and device of said equipment used in said industrial process.

20. The apparatus of claim 19, wherein said event data is linked to said device of said equipment.

21. The apparatus of claim 17, wherein at least one of said event attributes matches at least one of said activity attributes.

22. The apparatus of claim 16, wherein said request identifies said first event with a reference selected from the group consisting of: time based reference with respect to an interval of said first activity, direct reference to said first activity and indirect reference to said first activity.

23. The apparatus of claim 22, wherein said time based reference is with respect to all events that occur during said interval.

24. The apparatus of claim 22, wherein said direct reference directly refers to said first activity.

25. The apparatus of claim 22, wherein said indirect reference includes a reference to an equipment used by said industrial process during said first activity.

26. A memory media comprising a computer readable activity framing program that when executed on a computer controls said computer to process output data of an industrial process stored in a memory,
   wherein said activity framing program controls said computer to generate an access request that is based on a data structure that comprises a plurality of activities and events of said industrial process, one or more attributes of a first one of said activities, and one or more attributes of a first one of said events, wherein said first event is time framed by said first activity, wherein a first attribute of said first activity has an attribute value that is linked to said first event, and wherein said request additionally identifies said attribute value, wherein said first attribute identifies an item used in said process and said attribute value identifies a device that is associated with said item and that is linked to said first event;
   wherein said output data is stored in said memory based on said activities, events and attribute; and
   wherein said activity framing program control said computer to respond to said access request by using said data structure to access said output data of said industrial process in said memory to retrieve event data of said first event.

* * * * *